United States Patent
Brutscher et al.

(10) Patent No.: US 6,988,376 B2
(45) Date of Patent: Jan. 24, 2006

(54) AIR-CONDITIONING SYSTEM

(75) Inventors: Norbert Brutscher, Lindenberg (DE); Joachim Haas, Wangen (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 28 days.

(21) Appl. No.: 10/759,572

(22) Filed: Jan. 16, 2004

(65) Prior Publication Data

US 2005/0011217 A1 Jan. 20, 2005

(30) Foreign Application Priority Data

Jan. 16, 2003  (DE)  ......................................... 103 01 465

(51) Int. Cl.
*F25D 9/00* (2006.01)

(52) U.S. Cl. .............................. 62/401; 62/239; 62/402; 244/118.5; 244/154 R

(58) Field of Classification Search .................. 62/401, 62/402, 89, 133, 172, 239, 244; 244/118.5, 244/154 R, 118.1
See application file for complete search history.

(56) References Cited

U.S. PATENT DOCUMENTS

| | | | | | |
|---|---|---|---|---|---|
| 3,965,673 | A | * | 6/1976 | Friedrich | 60/788 |
| 4,018,060 | A | * | 4/1977 | Kinsell et al. | 62/91 |
| 4,261,416 | A | * | 4/1981 | Hamamoto | 165/271 |
| 4,262,495 | A | * | 4/1981 | Gupta et al. | 62/402 |
| 4,263,786 | A | * | 4/1981 | Eng | 62/87 |
| 4,283,924 | A | * | 8/1981 | Schutze | 62/402 |
| 4,399,665 | A | * | 8/1983 | Evans et al. | 62/239 |
| 4,487,034 | A | * | 12/1984 | Cronin et al. | 62/402 |
| 4,735,056 | A | | 4/1988 | Goodman et al. | |
| 4,814,579 | A | * | 3/1989 | Mathis et al. | 219/202 |
| 6,050,103 | A | * | 4/2000 | Ko | 62/401 |
| 6,519,969 | B2 | * | 2/2003 | Sauterleute | 62/401 |
| 6,527,228 | B2 | * | 3/2003 | Mitani | 244/118.5 |
| 6,658,873 | B2 | * | 12/2003 | Clarke et al. | 62/172 |
| 2002/0113167 | A1 | | 8/2002 | Albero et al. | |

FOREIGN PATENT DOCUMENTS

| | | | |
|---|---|---|---|
| DE | 4309119 A1 | * | 9/1994 |
| GB | 1083574 | | 9/1967 |
| GB | 2355520 A | * | 4/2001 |
| JP | 4101296070 A | * | 5/1998 |
| WO | 96/20109 | | 4/1996 |

OTHER PUBLICATIONS

Patents Abstracts of Japan vol. 2000, No. 1, Jan. 31, 2000 & JP 11–268694, Oct. 5, 1999.
Sherbourne, R.B.; "A Fourth Air Conditioning Group," Aircraft Engineering, Bunhill Publications Ltd, London, GB, vol. 4, No. 4, Apr. 1973, pp. 22–26.
Anonymous: "Integral with Multiple Circuits," Research Disclosure, Kenneth Mason Publications, Hampshire, GB, vol. 367, No. 9, Nov. 1994.

\* cited by examiner

*Primary Examiner*—William E. Tapolcai
*Assistant Examiner*—Mohammad M. Ali
(74) *Attorney, Agent, or Firm*—Dilworth & Barrese LLP

(57) ABSTRACT

The present invention relates to an air-conditioning system, in particular for the air conditioning of an airplane cabin, comprising at least two air-conditioning plants which are in communication in each case on the inlet side with a supply line and on the outlet side with a cabin to be air conditioned or with a mixing chamber, with the supply line on the inlet side having at least one flow regulating valve in each case for the purpose of regulating the flow. A high redundancy with low losses in performance and with optimum costs and weight is achieved in that downstream of the flow regulating valves at least one connection line is provided which connects the supply lines on the inlet side or the air-conditioning plants on the pressurized air side to one another and which is provided with a valve, by means of which the connection line can be opened or closed in dependence on the valve position.

20 Claims, 5 Drawing Sheets

AIR-CONDITIONING SYSTEM

BACKGROUND OF THE INVENTION

The present invention relates to an air-conditioning system, in particular for the air conditioning of an airplane cabin, comprising at least two air-conditioning plants which are in communication in each case on the inlet side with a supply line and on the outlet side with a cabin to be air conditioned or with a mixing chamber, with the supply line on the inlet side having at least one flow regulating valve in each case for the purpose of regulating the flow.

An air-conditioning system of the aforesaid type is used for the heating/cooling of the cabin, for the supply of fresh air to the passengers and crew and for the optimum pressurizing of the cabin.

To be able to fulfill the aforesaid functions not only in normal operation, but also in the case of malfunction, i.e. with a partial failure of the plant, air-conditioning systems with a redundant design are known. The construction size and the weight must in particular be kept as low as possible on use as an airplane air-conditioning system.

To fulfill these functions, the following two embodiments of an airplane air-conditioning plant are known:
 a) an air-conditioning system comprising at least two separately arranged plants and without internal redundancy. The redundancy is hereby achieved by the second plant.
 b) an air-conditioning system comprising at least one plant and internal redundancy. The redundancy is achieved in this case by the components partly present in duplicate.

FIG. 1 shows an air-conditioning system in accordance with variant a). At least two usually identical air-conditioning plants are used here to satisfy the required functions. It is ensured that even if one plant fails in total, the second plant still fulfils the minimum requirements. As can be seen from FIG. 1, each of the air-conditioning plants is charged with supply air on the inlet side. The corresponding supply line is in each case provided with a flow regulating valve by means of which the respective flow on the pressurized air side can be regulated by the air-conditioning plant. On the outlet side, the air-conditioning plants are in communication with a mixing chamber into which furthermore circulating cabin air is introduced and which is in communication on the outlet side with the cabin and which supplies the latter with the correspondingly conditioned air. On the outlet side, the air-conditioning plants furthermore have check valves as can be seen from FIG. 1.

The function of such an air-conditioning plant can be seen from FIG. 2. Each of the air-conditioning plants (air-conditioning plant 1, air-conditioning plant 2) has a flow regulating valve FCV upstream of it. This valve serves for the regulation of the pressurized air passage of the respective air-conditioning plant and contains a flow measuring device and a pneumatically/electrically actuated valve for continuous flow regulation. If one of the air-conditioning plants should be switched off, the associated flow regulating valve FCV is completely closed.

Hot pressurized air from the engines or from an auxiliary unit is supplied to the flow regulating valve FCV. This has a temperature of approximately 200° C. and a pressure of approximately 3 bar. This air is pre-cooled to approximately 100° C. in the first heat exchanger on the pressurized air side (pre-heat exchanger or primary heat exchanger PHX) and subsequently further compressed in a compressor C. The pressurized air then flows for further cooling into the second heat exchanger on the pressurized air side (main heat exchanger or secondary heat exchanger (SHX) and is cooled here to approximately 40° C. The dehumidification subsequently takes place in a water extraction system. This consists of the components reheater REH, condenser CON and water extractor WE.

The air dehumidified in this manner is expanded in the turbine T and cooled in this process to approximately −30° C. The shaft power arising at the turbine in this process is used to drive the compressor C and a fan FAN which is arranged in the stagnation air duct and serves for the conveying of PHX/SHX stagnation air or ambient air. The air then flows from the turbine outlet through the cold side of the condenser CON and subsequently into the mixing chamber or into the cabin.

The said procedure takes place in normal operation in the air-conditioning plant 1 and in the air-conditioning plant 2 in accordance with FIG. 2.

For the purpose of regulating the temperature or the cooling capacity of the plant, a valve TCV is provided in each case which permits a variable bypass of the compressor C, main heat exchanger SHX and turbine T. Furthermore, the stagnation air volume can be varied by means of valves at the stagnation air duct inlet and/or outlet (RAIA and RAOA).

In addition to the fan FAN, the fan bypass with a check valve GCKV 1 is also located in the stagnation air duct, whereby the transmission of the stagnation air duct is increased in flight.

If a shaft device ACM consisting in the present case of a fan FAN, a compressor C and a turbine T fails, the train of this partially defective plant can still be used for pressurized air transport in air, however with reduced cooling capacity, whereby the second still intact plant is supported with respect to flow and cooling capacity. The cooling of the pressurized air in the partially defective plant takes place in this process only by the stagnation air heat exchanger PHX, SHX, without an expansion being able to take place in the failed turbine T.

A complete failure of an air-conditioning plant occurs when, for example, a line breaks, for example the line from the flow regulating valve FCV to the pre-heat exchanger PHX, or when a flow regulating valve FCV closes incorrectly. In this case, the pressurized air supply of the corresponding air-conditioning plant is lost, whereby it fails completely. To meet the required minimum airflow, the remaining plant must convey approximately 30% more flow.

It results from this that the largest performance losses in flight for the air-conditioning system in accordance with FIG. 2 thus occur when a flow regulating valve closes incorrectly or if a line break occurs. Both actions are linked to the failure of one of the air-conditioning plants. In contrast, the failure of a shaft device only means a power reduction of the respective air-conditioning plant since PHX and SHX of this plant are still available for the cooling.

Due to the relatively complex design of the flow regulating valve FCV, a defective closing of this valve is much more probable than a line break or a heat exchanger break. A clear power reduction of the air-conditioning system in flight thus primarily results due to an incorrect closing of the flow regulating valve FCV. The reasons for this can be the failure of the valve mechanism, the failure of the valve actuation or the failure of the flow measurement of the flow regulating valve.

In addition to the architecture described by way of example and shown in FIG. 2 with a 3-wheel ACM per air-conditioning plant, other plant concepts are naturally also possible such as a 4-wheel ACM per plant or two serially arranged ACMs per plant or also motorized ACMs. Furthermore, different dehumidification systems are feasible.

The embodiment of the shaft device and of the dehumidification system does not, however, change anything in the general circumstances that at least two separately arranged air-conditioning system are used to fulfill the redundancy demands.

In addition to air-conditioning system with two separately arranged air-conditioning plants, air-conditioning systems in accordance with variant b) are likewise known which have a plant with internal redundancy. The redundancy is achieved in that components of the plant are partly present in duplicate.

Components with a relatively high failure possibility and significantly negative system effects such as the shaft device ACM and the flow regulating valve FCV are present in duplicate in this system. An air-conditioning system with partially multiply present components is known from EP 0 891 279 B1.

FIG. 3 shows an air-conditioning system with a shaft device ACM1, ACM2 present in duplicate and with a flow regulating valve FCV1, FCV2 provided in duplicate.

The stagnation air heat exchangers PHX, SHX and the water extraction system consisting of the components REH, CON, WE are, in contrast, only present once.

A relatively compact construction thereby results and thus low construction space requirements compared to the system architecture shown in FIG. 2.

The basic cooling process itself is identical to the process described with reference to FIG. 2.

In normal operation, the flow regulating valves FCV1, FCV2 provided in duplicate for reasons of redundancy are supplied with hot pressurized air (approximately 200° C. and 3 bar) from the engines or from an auxiliary unit. These valves include a flow measurement device and a pneumatic/electrical valve for the continuous flow regulation. If the air-conditioning system should be switched off, both valves FCV1, FCV2 are fully closed.

The FCV outlet air is merged and pre-cooled to approximately 100° C. in the joint stagnation air heat exchanger PHX. Approximately half of the PHX outlet air in each case is compressed in the compressor C1 and in the compressor C2 and is cooled to approximately 40° C. by the stagnation air after the merging in a secondary heat exchanger SHX. For condensation and water separation, the cooled pressurized air is guided through the reheater REH, the condenser CON and the water extractor WE. The pressurized air is subsequently divided again and in each case approximately half is expanded in turbine T1 and in turbine T2 and cooled in this process to approximately −30° C. After merging, this air flows through the cold side of the condenser CON and finally by means of a joint line into the mixing chamber of the airplane.

In the architecture shown by way of example in FIG. 3, each shaft device ACM1, ACM2 consists of three wheels which are connected by a shaft. The turbine shaft performance is used for the driving of the compressor C1, C2 and of the fan FAN1, FAN2. The fans FAN1, FAN2 are arranged in parallel so that each fan transports approximately half the stagnation air through the joint PHX and SHX on the ground. In flight, the flow from the PHX and SHX with stagnation air takes place here mainly due to the stagnation pressure.

The stagnation air is supplied to the main heat exchanger SHX and to the downstream per-heat exchanger PHX on the stagnation air side in a duct and is sucked through a common duct by the two fans FAN1, FAN2 after the PHX. This stagnation air then flows back to the environment via two separate fan outlet ducts.

The temperature regulation of the cooling air as a rule takes place by means of two valves TCV1, TCV2 and of the stagnation air duct valves RAIA, RAOA1 and RAOA2. The valves TCV1 and TCV2 additionally serve to ensure a synchronous operation of the two shaft devices.

A typical error case in the architecture of the air-conditioning system shown in FIG. 3 is the failure of a shaft device ACM. In this case, certain minimum requirements with respect to air volume and cooling capacity must be also be ensured. In order also to satisfy these functions in the error case, two additional valves SOV1, SOV2 are arranged at the respective turbine inlet as can be seen from FIG. 3. Furthermore, two additional check valves CCKV1, CCKV2 are integrated at the respective compressor inlet of the compressors C1, C2.

If e.g. the shaft device ACM1 fails (seized shaft), the check valve CCKV1 prevents a useless circular flow of the air compressed by the compressor C2 in operation via the compressor C1 back to the inlet of the compressor C2. The valve SOV1 is closed so that the air compressed by the compressor C2 is not expanded uselessly via the standing turbine T1, but only via the functioning turbine T2 of the ACM2 in operation.

Due to the failure of an ACM, the remaining intact ACM should now convey the total air. This is, however, not possible since each ACM is designed for weight and construction size reasons only for approximately 50% of the total air volume (normal operation) and cannot cope with double the air volume. To achieve the necessary transmission, a partial bypass of the remaining functioning ACM2 is thus required by opening the valve TCV2 or by an over-dimensioned plant (with respect to normal operation)

In ground operation (no stagnation pressure) and if the shaft device (e.g. ACM1) has failed, the associated stagnation air duct outlet valve RAOA1 must be closed, since otherwise the functioning fan FAN2 would suck in the air from the oppositely disposed outlet duct and not through the stagnation air heat exchangers PHX, SHX. This system architecture therefore requires at least two controllable stagnation air outlet valves as is reproduced in FIG. 3.

In addition to this architecture described by way of example with two 3-wheel ACMs per plant or per jointly used heat exchanger, other plant concepts are naturally also possible such as two 4-wheel ACMs arranged in parallel per plant or at least two serially arranged ACMs per plant or motorized ACMs or also different dehumidification systems. The design and arrangement of the ACMS can be as desired, i.e. apart from the exemplary said 3-wheel and 4-wheel machines and their arrangements, any other variants are feasible.

The embodiment of the shaft device and of the dehumidification system does not, however, change anything in the general circumstances that at least two separately arranged air-conditioning system are used to fulfill the redundancy demands.

The embodiments described above of an air-conditioning system in accordance with FIG. 1, FIG. 2 or FIG. 3 are associated with the disadvantages listed in the following:
1. Two identical and separately arranged plants in accordance with FIG. 1, FIG. 2:
   The failure of a flow regulating valve FCV results in the failure of an air-conditioning plant. To also achieve the required cooling capacity and the required air flow in this error case, the plant must be designed for this case. This means that under normal conditions, when both plants are in operation, the air-conditioning system is over-dimensioned. The designing for this error case (only one plant functional) requires larger heat exchangers PHX/SHX and a larger stagnation air duct and line cross-sections. This is associated with corresponding disadvantages with respect to the construction size and weight of the air-conditioning plant.

Whereas the failure of the supply air due to a failure of a flow regulating valve can be largely avoided by the installation of two flow regulating valves and flow measuring devices arranged in parallel per air-conditioning plant, since the probability of the failure of the supply air due to an incorrect closing of both flow regulating valves is very low. Such a system results from FIG. 4. However, at the same time, the probability that at least one flow regulating valve is incorrectly open doubles. This can result in a very high, uncontrolled flow and thus to extreme pressure and temperature demands in the air-conditioning plant. These high strength demands can likewise result in the switching off of the corresponding plant to avoid damage by overload (e.g. line break).

The use of two flow regulating valves per plant is furthermore disadvantageous because the costs and the weight of the air-conditioning system thereby increase considerably, while the system reliability is reduced, which is due to a higher number of components.

2. A plant present once with components partly available in duplicate in accordance with FIG. 3.

In comparison with the embodiment in accordance with FIG. 1, FIG. 2, two valves SOV1 and SOV2 and two check valves CCKV1, CCKV2 are required as additional components.

Furthermore, the guaranteeing of synchronous operation of the two shaft devices ACM1, ACM2 requires an additional monitoring and regulating effort. On the failure of a shaft device, a fast actuation of the valves (e.g. SOV) is necessary to ensure correct operation and the satisfaction of the functions, pressurizing, venting and cooling. Another disadvantage results in that specific components are only present once such as the line from the FCV1 and FCV2 to the PHX, heat exchanger, line from the air-conditioning system to the mixing chamber. A failure of only one of these components, for example a line break, results in the total failure of the total air-conditioning system. In contrast to this, with two or more separately arranged air-conditioning plants, a line break results, for example, only in the failure of one of the air-conditioning plants, that is e.g. in the failure of one of two air-conditioning plants.

If a shaft device fails, the cooling capacity and transmission of the system is much lower in comparison to the embodiment in accordance with FIG. 2.

If e.g. the ACM 1 in accordance with FIG. 3 fails (fixed shaft), the check valve CCKV1 prevents the compressed air from the compressor C2 in operation from flowing back via the compressor C1 to the inlet of the compressor C2 (useless circular flow). As explained above, the valve SOV1 is closed so that the air compressed by the compressor C2 is not expanded uselessly via the standing turbine T1, but only via the functioning turbine T2. Due to the failure of an ACM, the remaining intact ACM should now convey the total air. As explained above, this is, however, not possible since each ACM and the corresponding line cross-sections are only designed for approximately 50% of the total air volume (normal operation) and cannot cope with double the air volume. The transmission and the cooling capacity of the plant is thereby greatly reduced in the defect case because an at least partial bypassing of the ACM and of the main heat exchanger SHX is necessary (TCV still open).

This disadvantage can also only be insufficiently compensated by an overdimensioning of the ACMs, i.e. the design takes place e.g. to 70%, instead of 50% of the total flow, because the construction space requirements and the weight and the costs of the ACMs thereby increase. It must be taken into account in this process that the weight of a component substantially represents a function of the flow.

Whereas in an embodiment with two separately arranged air-conditioning plants, a failure of the flow regulating valve results in a significant reduction in performance of the air-conditioning system, in an embodiment with one plant and components partly present in duplicate, the failure of the shaft device or of the additional valves SOV1 and SOV2 results in considerable losses in performance.

SUMMARY OF THE INVENTION

It is therefore the object of the present invention to make available an air-conditioning system in which, on the occurrence of a single error, such as the failure of a flow regulating vale, of a shaft device, or on a line break, no or only small losses in performance occur and in which low costs and a low weight result.

This object is solved by an air-conditioning system of the embodiment variant with at least two air-conditioning plants in that downstream of the flow regulating valves at least one connection line is provided which connects the supply lines on the inlet side or the air-conditioning plants on the pressurized air side to one another and which is provided with a valve, by means of which the connection line can be opened or closed in dependence on the valve position.

It is particularly advantageous in this process if the connection line is arranged downstream of the flow regulating valves and upstream of the first heat exchangers of the air-conditioning plants on the pressurized air side.

The air-conditioning system in accordance with the invention has the advantage that a high cooling capacity and transmission can be achieved even with an incorrectly closed flow regulating valve (failure of the valve mechanism, of the valve drive or of the flow measuring device). In this case, the valve of the connection line in accordance with the invention can be opened, which has the consequence that both air-conditioning plants can be supplied through one FCV. Both air-conditioning plants can thus still be used for the air conveying and air cooling despite the failure of an incorrectly closed flow regulating valve, from which the full cooling capacity results.

It results as another advantage that a high redundancy is achieved due to the presence of two air-conditioning plants. It is particularly advantageous in this process when all components are present in duplicate. In this case, a line break does not result in the total failure of the air-conditioning system.

For the event that a flow regulating valve is incorrectly open, very high flows and thus pressure and temperature requirements can occur in the air-conditioning plant. So that these strength requirements can be absorbed up to a specific limit, the components must be dimensioned correspondingly bigger. These demands can be reduced by the connection line with valve in accordance with the invention. For this purpose, the valve is opened and the remaining, still functional flow regulating valve is partly or fully closed. It can be achieved in this manner that the high flow of the incorrectly open flow regulating valve is distributed over both air-conditioning plants, whereby the pressure and temperature requirements are reduced, which results in corresponding weight advantages.

Provision can be made that the valve of the connection line is only actuated on the system start (function test) and in the error case of a flow regulating valve. In comparison with a flow regulating valve, a very low operation time (actuation cycles) and thus a very high valve reliability thereby results.

A further advantage of the arrangement in accordance with the invention results in that failures of the valve of the connection line are very error tolerant. A failure of the valve in the open position does not result in any reduction in the performance of the air-conditioning system in normal operation or on the failure of a flow regulating valve.

Only on the improbable simultaneous failure of a flow regulating valve and of the valve in accordance with the invention in the closed position a performance reduction results since then only one of two air-conditioning system is flowed through. In this case, the remaining functional plant is, however, still sufficient to satisfy the minimum requirements.

In a further aspect of the present invention, it is provided that the valve is made as an open/closed valve. A simple open/closed valve with low tightness requirements can be provided. For this reason, the reliability of this valve is relatively high in comparison with the complex flow regulating valve. For the failure of an air-conditioning plant, the simultaneous failure of a flow regulating valve and of the relatively reliable valve of the connection line is necessary (dual defect). The probability of the total failure of an air-conditioning plant is thus very low. This state is thus no longer relevant for the system design. The design of the plant can thus takes place with respect to much lower demands (e.g. air-conditioning plant 1 with full function and air-conditioning plant 2 with failed shaft device). This results in a considerable reduction in construction volume and weight of the air-conditioning system, which is in particular of substantial advantage for use in airplanes.

A further advantage results in that the use of a single valve in the connection line is considerably more cost favorable and more reliable than the use of two additional, complex flow regulating valves, as is shown in FIG. 4.

In a further aspect of the invention, it is provided that the valve is made as regulating valve.

It can furthermore be provided that the valve and at least partly the connection line to the valve are integrated in a technical construction manner in the first heat exchangers of the air-conditioning plant on the pressurized air side. A particularly compact construction thus results which satisfies all functions of the air-conditioning system in accordance with the invention.

A particular favorable operation results in that the valve is closed in the normal operation of the air-conditioning system and is open on the failure of a flow regulating valve.

The air-conditioning plants can be designed such that they can be flowed through by air or by another medium.

Each of the air-conditioning plants can have one or more shaft devices arranged in parallel or in series. The shaft devices of the air-conditioning plants can be made as 3-wheel machines or as 4-wheel machines. No restrictions exist with respect to the embodiment or arrangement of the shaft devices.

They can, for example, be made as motorized shaft devices.

In a further aspect of the invention, provision is made for each of the air-conditioning plants to have a first heat exchanger on the pressurized air side which has a downstream compressor and a second heat exchanger on the pressurized air side which is downstream of the compressor.

Each of the air-conditioning systems can have a dehumidification system which is downstream of the second heat exchanger on the pressurized air side and upstream of a turbine.

The dehumidification system preferably consists of the components reheater, condenser and water extractor.

The arrangement and embodiment of the water extraction system can also be made in any other variant such that the said components and their arrangement only relate to exemplary aspects.

An advantageous embodiment exists with respect to the arrangement of the heat exchangers on the stagnation air side in that the first heat exchanger on the pressurized air side is downstream of the second heat exchanger on the pressurized air side on the stagnation air side. Any other arrangement possibilities are also feasible in this process.

The present invention further relates to a heat exchanger unit for an air-conditioning system, in particular for the air-conditioning of an airplane cabin, comprising at least one first and one second heat exchanger which each have an inlet on the pressurized air side and an outlet as well as comprising a connection line which connects the inlets of the heat exchangers on the pressurized air side to one another and which has a valve by means of which the connection line can be opened or blocked in dependence on the valve position.

BRIEF DESCRIPTION OF THE DRAWINGS

Further advantages and details of the present invention will be explained in more detail with reference to the drawings. There are shown.

DESCRIPTION OF THE PREFERRED EMBODIMENTS

Figure 5:
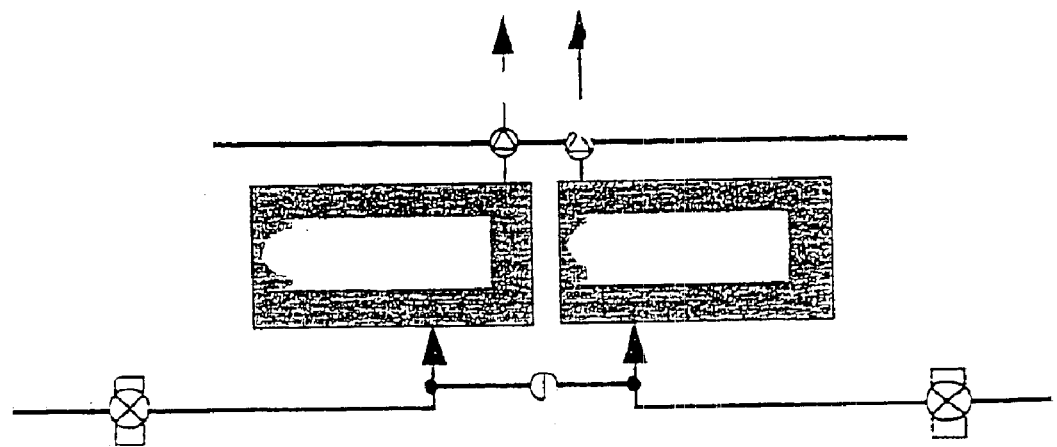
FIG. 5: a schematic representation of an air-conditioning system in accordance with the present invention with a connection line with a blocking valve connecting the supply lines.

FIG. 5 shows the air-conditioning system in accordance with the invention with an air-conditioning plant 1 and an air-conditioning plant 2. Both air-conditioning plants are arranged separately and preferably identically such that all components are present in duplicate. A line break thus does not result in the total failure of the air-conditioning system.

Figure 3:
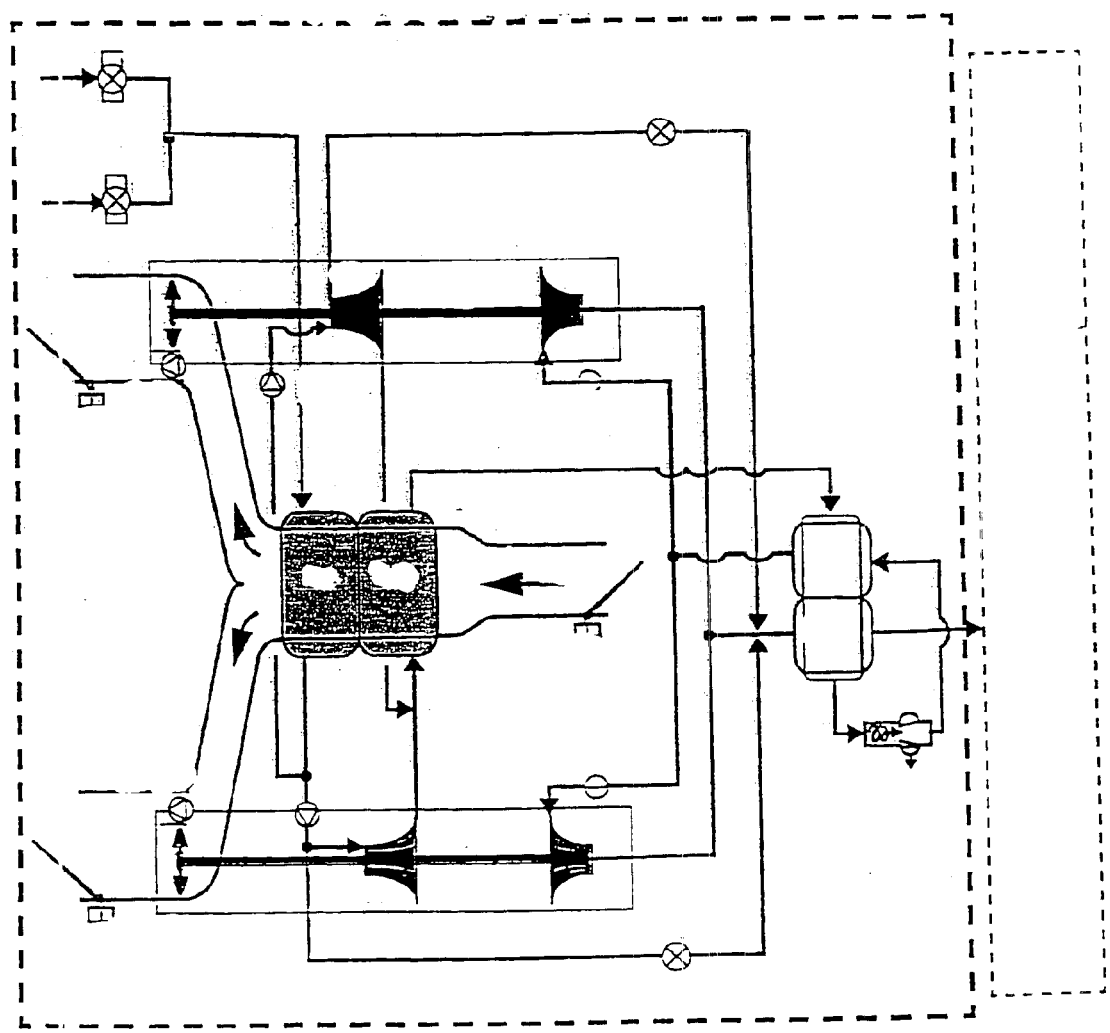
FIG. 3: an air-conditioning system with an air-conditioning plant and components partly present in duplicate.
Figure 4:
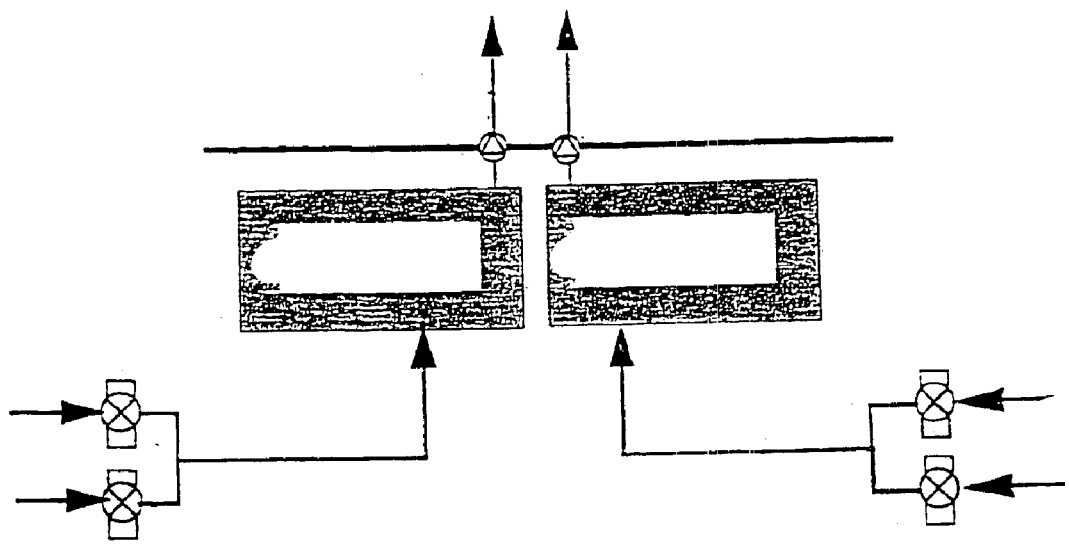
FIG. 4: an air-conditioning system with two flow regulating valves per air-conditioning plant.

The advantage results with respect to the system shown in FIG. 3 that the failure of a shaft device only results in a relatively low reduction of transmission and cooling capacity.

Figure 1:
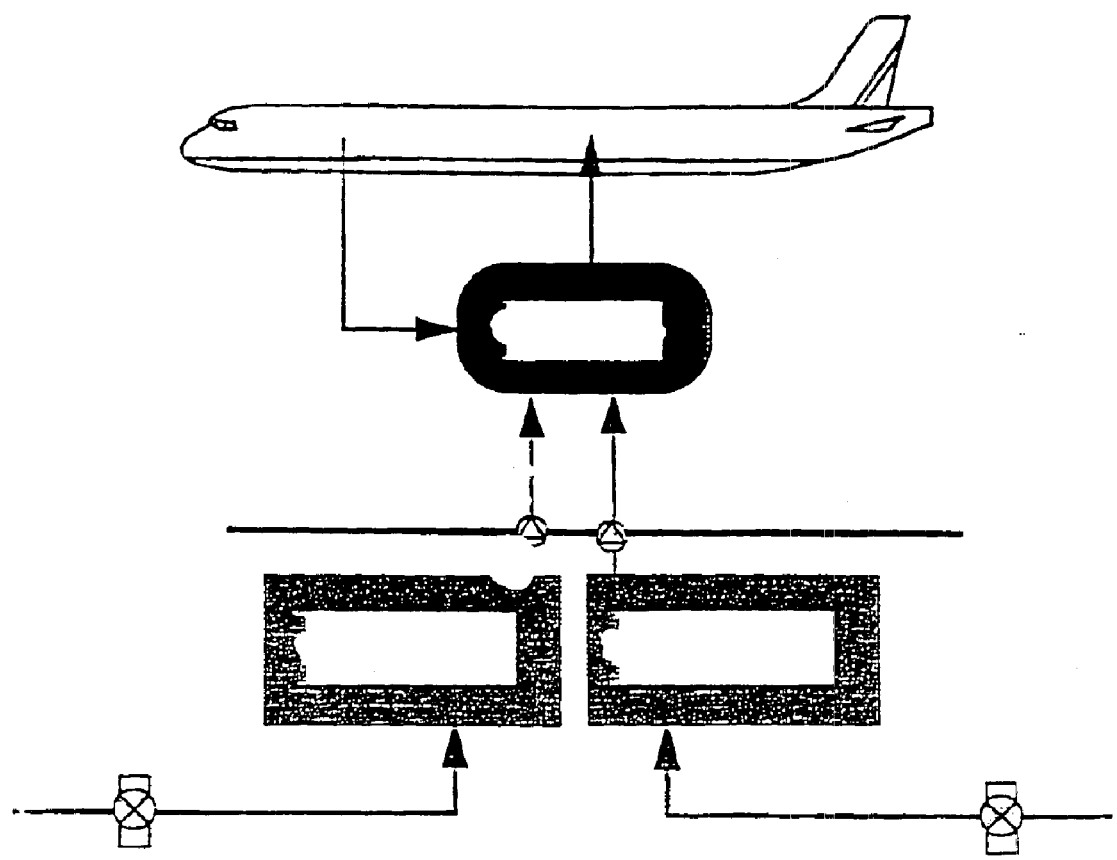
FIG. 1: a schematic representation of an air-conditioning system with two air-conditioning plants.
Figure 2:
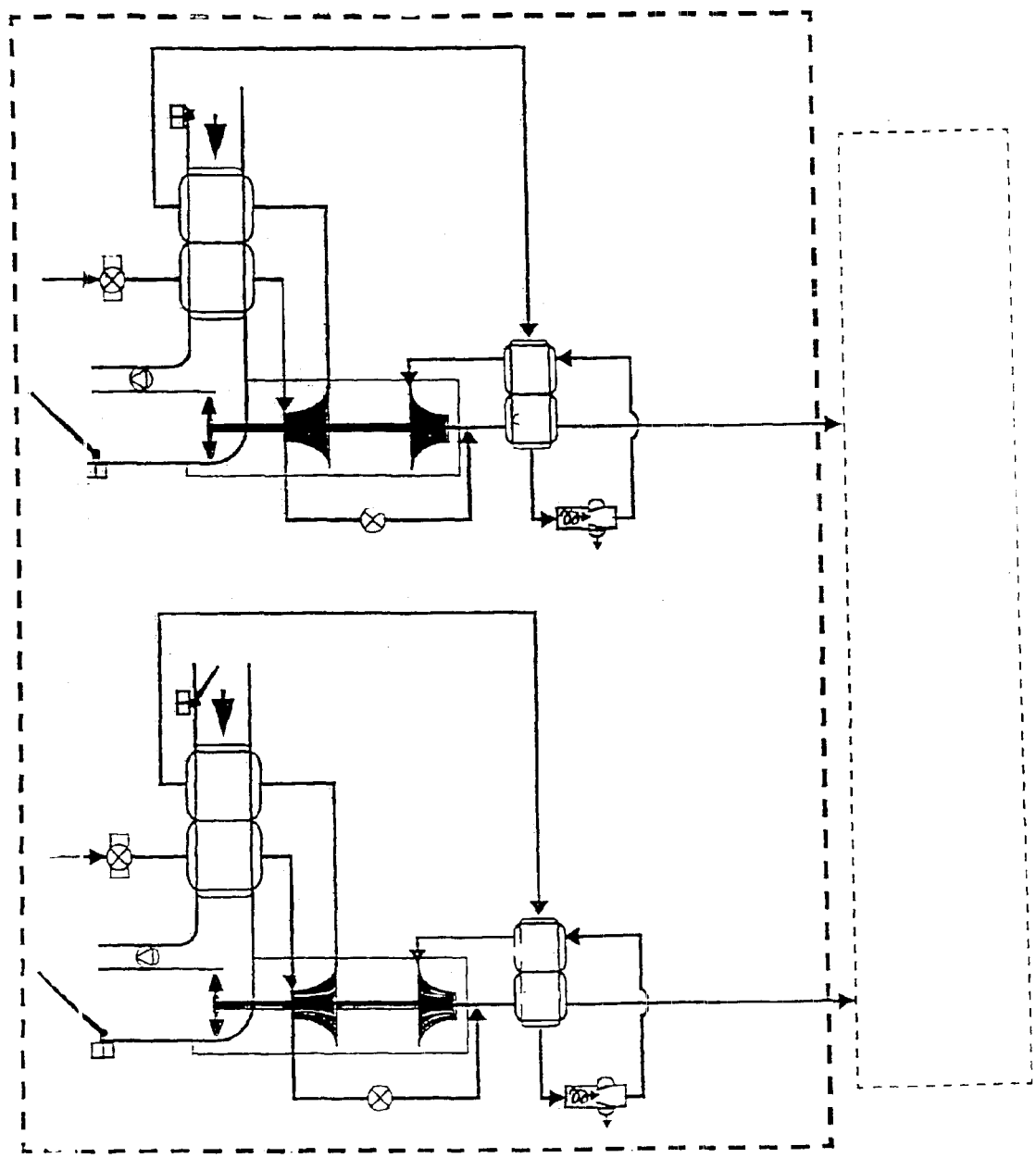
FIG. 2: an air-conditioning system with two identical and separately arranged air-conditioning plants.

On the inlet side, the air-conditioning plants are supplied with pressurized air, which is shown in FIG. 5 with the designation "supply air". In the corresponding supply lines, a respective flow regulating valve is located for the purpose of the regulation of the flow of the respective air-conditioning plant. The corresponding supply lines are connected, as shown in FIG. 5, downstream of the flow regulating valves by means of a connection line. This has the valve PXV, which is closed in the normal operation shown in FIG. 5. In this, each flow regulating valve supplies the corresponding air-conditioning plant with the desired pressurized air flow. A connection on the inlet side on the pressurized air side of both air-conditioning plants is prevented in accordance with this embodiment by the valve PXV closed in normal operation. The function and architecture of the air-conditioning system otherwise corresponds, in a preferred aspect of the present invention, to the function shown with respect to FIG. 2 and the system design of the air-conditioning system described with reference to FIG. 2.

Figure 6:
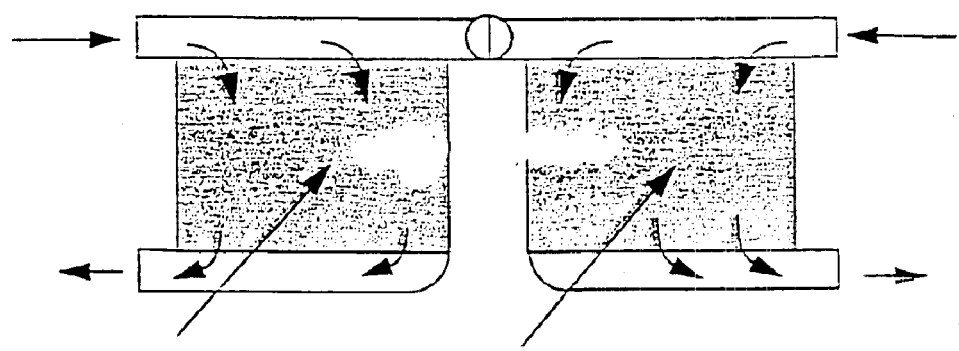
FIG. 6: a schematic representation of the integration of the valve in accordance with the invention with a connection line in the first heat exchangers on the pressurized side.

In a preferred aspect of the present invention, it can be provided that the valve PXV and the connection line are at least partly integrated in the first heat exchangers PHX1, PHX2 on the pressurized air side, as is shown in FIG. 6. In this manner a unit results in a technical construction manner which is built correspondingly compactly and thus takes up particularly little space. The pre-heat exchangers PHX1, PHX2 are loaded with pressurized air when the flow regulating valves 1 and 2 are open and each have an outlet by means of which the pressurized air flows into the respective compressor after passing through the pre-heat exchanger. The pre-heat exchangers PHX1, PHX2 are flowed through by stagnation air for the cooling of the pressurized air.

Figure 7:
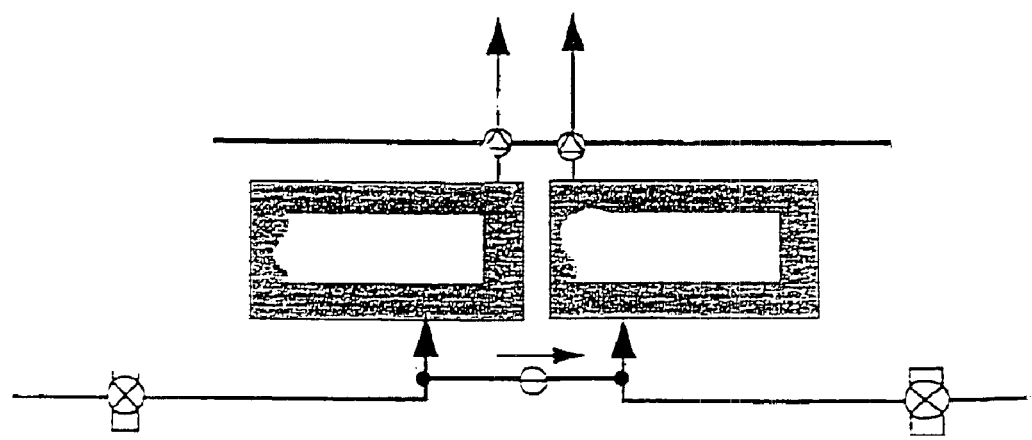
FIG. 7: a schematic representation of an air-conditioning system in accordance with the present invention with an incorrectly closed flow regulating valve.

FIG. 7 shows the air-conditioning system in accordance with FIG. 5 with an incorrectly closed flow regulating valve FCV2. In this case, the total pressurized air supply is taken over by the flow regulating valve shown on the left. The valve PXV in accordance with the invention is opened such that both air-conditioning plants, i.e. also the air-conditioning plant 2 in accordance with FIG. 7, are supplied with pressurized air and thus can also be used in full for the air conveying and the air cooling. The failure of the flow regulating valve FCV2 thus does not have a negative influence with respect to the cooling capacity of the air-conditioning system.

For the case not shown in FIG. 7 that a flow regulating valve is incorrectly open, the valve in accordance with the invention can likewise be advantageously used. It can be provided in this case that the remaining still functional flow regulating valve is partially or wholly closed so that the pressurized air supply only takes place through the incorrectly open flow regulating valve. The valve PXV in accordance with the invention is opened, whereby —in a similar manner as shown in FIG. 7—the high flow of the incorrectly open flow regulating valve is distributed over both air-conditioning plants. The pressure and temperature requirements are thus accordingly reduced, from which weight advantages result.

The present invention makes it possible to make available an air-conditioning system which has no or only very small losses in performance with high redundancy. This is achieved in accordance with the invention in that at least one connection line is provided downstream of the flow regulating valves and connects the supply lines on the inlet side or the air-conditioning plants on the pressurized air to one another. This is provided with a block valve which is preferably closed in the normal case and is open in the defect case. It is particularly advantageous if the connection line is arranged upstream of the first heat exchangers of the air-conditioning plant on the pressurized air side.

Embodiments are also covered by the invention in which the connection line is, for example, also arranged downstream of the first heat exchangers on the pressurized air side or of further components of the air-conditioning plants. An optimization of costs and weight can, however, be achieved with maximum redundancy if the connection line is arranged downstream of the flow regulating valves and upstream of the first heat exchangers of the air-conditioning plants on the pressurized air side.

What is claimed is:

1. An air-conditioning system, for the air conditioning of an airplane cabin, comprising at least two air-conditioning plants which are in communication in each case on the inlet side with a supply line and on the outlet side with a cabin to be air conditioned or with a mixing chamber, with the supply line on the inlet side having at least one flow regulating valve in each case for the purpose of regulating the flow, wherein
   at least one connection line is provided downstream of the flow regulating valves which connects the supply lines on the inlet side or the air-condition plants on the pressurized air side to one another and which is provided with a valve, by which the connection line can be opened or closed in dependence on the valve position.

2. An air-conditioning system in accordance with claim 1, wherein the connection line is arranged downstream of the flow regulating valves and upstream of the first heat exchangers of the air-conditioning plants on the pressurized air side.

3. An air-conditioning system in accordance with claim 1, wherein the valve is made as an open/closed valve.

4. An air-conditioning system in accordance with claim 1, wherein the valve is made as a regulating valve.

5. An air-conditioning system in accordance with claim 1, wherein the valve and at least partly the connection line leading to the valve are integrated in a technical construction manner in the first heat exchangers of the air-conditioning plants on the pressurized air side.

6. An air-conditioning system in accordance with claim 1, wherein the valve is closed in the normal operation of the air-conditioning system and is open on the failure of a flow regulating valve.

7. An air-conditioning system in accordance with claim 1, wherein the air-conditioning plants are made such that they can be flowed through by air or by another medium.

8. An air-conditioning system in accordance with claim 1, wherein each of the air-conditioning plants has one or more shaft devices arranged in parallel or in series.

9. An air-conditioning system in accordance with claim 8, wherein the shaft devices are made as desired, for example as 3-wheel machines or as 4-wheel machines.

10. An air-conditioning system in accordance with claim 8, wherein the shaft devices are made as motorized shaft devices.

11. An air-conditioning system in accordance with claim 1, wherein each of the air-conditioning plants has a first heat exchanger on the pressurized air side which has a downstream compressor and a second heat exchanger on the pressurized air side which is downstream of the compressor.

12. An air-conditioning system in accordance with claim 11, wherein each of the air-conditioning plants has a dehumidification system which is downstream of the second heat exchanger and upstream of a turbine on the pressurized air side.

13. An air-conditioning system in accordance with claim 12, wherein the dehumidification system comprises a reheater, condenser and water extractor.

14. An air-conditioning system in accordance with claim 11, wherein the first heat exchanger on the pressurized air side is downstream of the second heat exchanger on the pressurized air side on the stagnation air side.

15. An air-conditioning system in accordance with claim 2, wherein the valve is made as an open/closed valve.

16. An air-conditioning system in accordance with claim 2, wherein the valve is made as a regulating valve.

17. An air-conditioning system in accordance with claim 2, wherein the valve and at least partly the connection line leading to the valve are integrated in a technical construction manner in the first heat exchangers of the air-conditioning plants on the pressurized air side.

18. An air-conditioning system in accordance with claim 3, wherein the valve and at least partly the connection line leading to the valve are integrated in a technical construction manner in the first heat exchangers of the air-conditioning plants on the pressurized air side.

19. An air-conditioning system in accordance with claim 4, wherein the valve and at least partly the connection line leading to the valve are integrated in a technical construction manner in the first heat exchangers of the air-conditioning plants on the pressurized air side.

20. A heat exchanger unit for an air-conditioning system, in particular for the air-conditioning of an airplane cabin, comprising at least one first and one second heat exchanger which each have an inlet on the pressurized air side and an outlet as well as comprising a connection line which connects the inlets of the heat exchangers on the pressurized air side to one another and which has a valve by which the connection line can be opened or blocked in dependence on the valve position.

* * * * *